United States Patent
Tourneur et al.

(10) Patent No.: US 8,201,332 B2
(45) Date of Patent: Jun. 19, 2012

(54) METHOD FOR REINFORCING A METAL TUBULAR STRUCTURE

(75) Inventors: Christian Tourneur, Le Mesnil Saint Denis (FR); Marc Antoine, Escalquens (FR); Ivica Zivanovic, Arnouville (FR); Alain Autissier, Egleton (FR); Rolland Faillie, Toulouse (FR)

(73) Assignees: Soletanche Freyssinet, Vilezy Villacublay (FR); TDF, Paris (FR)

( * ) Notice: Subject to any disclaimer, the term of this patent is extended or adjusted under 35 U.S.C. 154(b) by 1036 days.

(21) Appl. No.: 11/884,890

(22) PCT Filed: Feb. 17, 2006

(86) PCT No.: PCT/FR2006/000370
§ 371 (c)(1),
(2), (4) Date: Aug. 22, 2007

(87) PCT Pub. No.: WO2006/090048
PCT Pub. Date: Aug. 31, 2006

(65) Prior Publication Data
US 2008/0313907 A1    Dec. 25, 2008

(30) Foreign Application Priority Data
Feb. 22, 2005    (FR) ...................... 05 01789

(51) Int. Cl.
*B23P 6/00*    (2006.01)
*E04G 23/00*    (2006.01)

(52) U.S. Cl. ................ 29/897.1; 29/897.34; 29/897.33; 29/460; 29/458; 52/742.14

(58) Field of Classification Search ................ 29/897.1, 29/897.33, 987.34, 460, 458, 402.09, 402.01, 29/89.34; 52/223.4, 834, 742.14, 301
See application file for complete search history.

(56) References Cited

U.S. PATENT DOCUMENTS

| 765,053 | A | * | 7/1904 | Tafel | 138/171 |
| 909,299 | A | * | 1/1909 | Hilborn et al. | 52/745.15 |
| 973,670 | A | * | 10/1910 | Kinnear | 52/223.5 |
| 1,087,334 | A | * | 2/1914 | Stevens | 405/257 |
| 1,545,456 | A | * | 7/1925 | Rastetter | 52/295 |
| 1,858,512 | A | * | 5/1932 | Langenberg et al. | 52/834 |
| 2,355,190 | A | * | 8/1944 | Upson | 405/224 |
| 3,145,540 | A | * | 8/1964 | Baittinger | 405/250 |
| 3,301,926 | A | * | 1/1967 | Reiland | 264/46.5 |
| 3,501,920 | A | * | 3/1970 | Uchiyama Minoru | 405/256 |
| 3,798,867 | A | * | 3/1974 | Starling | 52/834 |
| 3,987,593 | A | * | 10/1976 | Svensson | 52/98 |
| 4,018,055 | A | * | 4/1977 | Le Clercq | 405/257 |
| 4,071,996 | A | * | 2/1978 | Muto et al. | 52/745.21 |

(Continued)

FOREIGN PATENT DOCUMENTS

AU    5284273    12/1974

(Continued)

*Primary Examiner* — Essama Omgba
(74) *Attorney, Agent, or Firm* — McKenna Long & Aldridge LLP

(57) ABSTRACT

A method for reinforcing a metal tubular structure (1) including the following steps: introducing inside the metal tubular structure (1), a plurality of substantially linear elements (4) having a tensile strength higher than a predetermined value; and injecting a curable filling product inside the metal tubular structure, so that the curable filling product contacts an inner surface of the metal tubular structure (1) and coats the substantially linear elements (4) of said plurality of elements.

10 Claims, 1 Drawing Sheet

U.S. PATENT DOCUMENTS

| | | | |
|---|---|---|---|
| 4,313,287 A * | 2/1982 | Romig, Jr. | 52/223.4 |
| 4,407,106 A * | 10/1983 | Beck | 52/841 |
| 4,738,058 A * | 4/1988 | Svensson | 52/98 |
| 4,769,886 A * | 9/1988 | Berchem et al. | 29/897.34 |
| 4,783,940 A | 11/1988 | Sato et al. | |
| 5,056,284 A * | 10/1991 | Ruckdeschel et al. | 52/223.4 |
| 5,339,594 A * | 8/1994 | Ventura-Berti | 52/834 |
| 5,599,599 A * | 2/1997 | Mirmiran et al. | 428/36.3 |
| 6,108,996 A * | 8/2000 | McGinnis | 52/651.02 |
| 6,244,014 B1 * | 6/2001 | Barmakian | 52/834 |
| 6,284,336 B1 | 9/2001 | Greene | |
| 6,684,477 B2 * | 2/2004 | Crissey | 29/452 |
| 6,694,698 B2 * | 2/2004 | Ryan | 52/741.1 |
| 6,742,314 B2 * | 6/2004 | Young | 52/835 |
| 6,851,231 B2 * | 2/2005 | Tadros et al. | 52/223.4 |
| 6,854,171 B2 * | 2/2005 | Ulf et al. | 29/401.1 |
| 6,890,461 B2 * | 5/2005 | Minayoshi et al. | 264/34 |
| 6,901,717 B2 * | 6/2005 | Brunozzi et al. | 52/834 |
| 6,915,618 B2 * | 7/2005 | Payne | 52/849 |
| 6,938,392 B2 * | 9/2005 | Fouad et al. | 52/834 |
| 7,116,282 B2 * | 10/2006 | Trankina | 52/845 |
| 7,143,554 B2 * | 12/2006 | Sachs et al. | 52/251 |
| 7,253,786 B1 * | 8/2007 | Logozzo | 343/890 |
| 7,343,658 B2 * | 3/2008 | Minayoshi et al. | 29/281.5 |
| 7,367,075 B2 * | 5/2008 | Kim | 14/73.5 |
| 7,637,075 B2 * | 12/2009 | Mitchell | 52/834 |
| 7,849,659 B2 * | 12/2010 | Kopshever, Sr. | 52/745.17 |
| 7,905,069 B1 * | 3/2011 | Lockwood | 52/514 |
| 2004/0020158 A1 * | 2/2004 | Kopshever, Sr. | 52/723.2 |
| 2004/0134161 A1 * | 7/2004 | Lockwood et al. | 52/736.1 |
| 2004/0139665 A1 * | 7/2004 | Ullrich et al. | 52/169.9 |

FOREIGN PATENT DOCUMENTS

| | | |
|---|---|---|
| AU | 8517582 | 1/1983 |
| DE | 196 44 834 | 4/1998 |
| JP | 07-292999 | 11/1995 |
| JP | 2001-090254 | 4/2001 |
| JP | 2002-037583 | 2/2002 |
| WO | WO 2004/038106 | 5/2004 |

* cited by examiner

METHOD FOR REINFORCING A METAL TUBULAR STRUCTURE

This application claims priority to PCT/FR2006/000370 filed on Feb. 17, 2006, and French Application No. 0501789 filed Feb. 22, 2005 in France, all of which are hereby incorporated by reference in their entirety.

FIELD OF INVENTION

The present invention relates to a method for reinforcing a metal tubular structure.

BACKGROUND OF THE INVENTION

Such a metal tubular structure is for example of the type consisting of a trellis of tubular elements. It then consists of a plurality of metal tubular sections assembled together.

The shape of the metal structure is generally adapted to its use. It can thus form a mast supporting radio transmission aerials, in particular for radio broadcasting, or an offshore structure etc.

In all cases, such a structure is subjected to various forces. If it consists for example of a radio transmission mast, these forces comprise in particular the effect of the weight of the aerials positioned on the mast as well as the effect of external actions such as the weight of snow, wind pressure, seismic phenomena etc.

The structures are therefore dimensioned, when designed, to withstand service loads and accidental loads, according to the equipment installed on these structures, for example the number and type of aerials surmounting a mast.

Technological developments and operating constraints sometimes lead to the replacement of apparatuses used by different items of equipment or of the addition of others. Operating loads and the action of external stresses therefore become modified by these, with the consequence that it is necessary to reinforce the structure in situ or to replace it.

Known reinforcing methods consist of adding or replacing elements of the metal structure in situ so as to increase the metal sections in the desired proportions in order to meet new stresses. This restructuring process is generally complex, in particular in the region of assembly points of the structure. It moreover involves disturbance to, or even the stoppage of, operations associated with demounting the installed equipment, for example aerials, during the period of operations. These stoppages are costly and very restricting for the operator. Moreover, these reinforcements modify the external appearance of the structure and can therefore make it necessary to obtain prior work authorization that can considerably retard operations.

WO 2004/038106 discloses another method for reinforcing a metal tubular structure, wherein a metal reinforcing layer is placed at a distance from an internal surface of the tubular structure so as to form a cavity between said reinforcing layer and the tubular structure. Plastic or polymer is injected into this cavity, so that, after curing, it adheres to the reinforcing layer and to the internal surface of the tubular structure.

Such an arrangement provides a reinforcement of the metal tubular structure when bending. On the other hand, it in no way improves the tensile strength and/or compressive strength that are however most significant as regards such a structure.

OBJECT OF THE INVENTION

One object of the present invention is to reinforce metal tubular structures in tension and/or in compression, while limiting the abovementioned disadvantages thereof.

A more particular object of the invention is to reinforce metal tubular structures without stopping or disturbing the operation in which these structures participate.

SUMMARY OF THE INVENTION

The invention therefore provides a method for reinforcing a metal tubular structure comprising the following steps:
introducing inside the metal tubular structure, a plurality of substantially linear elements having a tensile strength greater than a predetermined value; and
injecting a curable filling product inside the metal tubular structure, so that the curable filling product comes into contact with an internal surface of the metal tubular structure and coats the substantially linear elements of said plurality.

The insertion of substantially linear elements inside the structure contributes to the reinforcement of the structure in tension. Injection of the curable filling product also makes it possible to form a monolithic composite capable of working in tension and in compression. In this way, the load-withstanding section of the tubular structure is increased and inertia is taken into account. In addition, this internal reinforcement of the metal tubular structure does not modify the external appearance.

According to particular embodiments of the invention that can be combined together in any conceivable way:
the substantially linear elements of said plurality comprise carbon rods;
the substantially linear elements of said plurality comprise threads and/or strands;
the metal tubular structure is installed so as to have an anchored lower end and a free upper end, and the substantially linear elements of said plurality are introduced from said free upper end of the metal tubular structure;
the substantially linear elements of said plurality are introduced inside the metal tubular structure so as to form a bundle of which the geometrical distribution is predetermined;
the substantially linear elements of said plurality are introduced inside the metal tubular structure via respective holes of a mesh connected to the metal tubular structure;
the substantially linear elements of said plurality are anchored on the mesh after having been introduced inside the metal tubular structure;
the metal tubular structure is installed so as to have an anchored lower end and a free upper end, and the substantially linear elements of said plurality are also introduced from said free upper end of the metal tubular structure via respective holes of a ballast weight, the holes of the ballast weight being distributed in a manner substantially corresponding to the holes of the mesh; the ballast weight is lowered with the aid of a cable, from the mesh toward the lower end of the metal tubular structure after having anchored the substantially linear elements of said plurality on the mesh;
the curable filling product comprises a cement grout;
the curable filling product comprises a liquid concrete with a mineral or synthetic binder;
the curable filling product comprises a resin;
an aggregate is attached to the periphery of the substantially linear elements of said plurality with the aid of a resin before said substantially linear elements are introduced inside the metal tubular structure;
the substantially linear elements of said plurality have portions in relief such as serrations on their periphery;

threads are attached on at least one portion of at least some of the substantially linear elements of said plurality so as to reinforce still further the corresponding portions of the metal tubular structure.

The invention additionally provides a metal tubular structure reinforced with the aid of a curable filling product injected inside said structure. The reinforced structure comprises a plurality of substantially linear elements having a tensile strength greater than a predetermined value, said plurality of substantially linear elements being placed inside the metal tubular structure. The filling product is, after curing, in contact with an internal surface of the metal tubular structure and coats the substantially linear elements of said plurality.

According to particular embodiments of the invention that can be combined together in all conceivable ways:
- the substantially linear elements of said plurality comprise carbon rods;
- the substantially linear elements of said plurality comprise threads and/or strands;
- the substantially linear elements of said plurality form a bundle of which the geometrical distribution is predetermined;
- the substantially linear elements of said plurality are introduced inside the metal tubular structure via respective holes of a mesh connected to the metal tubular structure and the substantially linear elements of said plurality are anchored on the mesh after having been introduced inside the metal tubular structure;
- the curable filling product comprises a cement grout;
- the curable filling product comprises a liquid concrete with a mineral or synthetic binder;
- the curable filling product is a resin;
- an aggregate is attached to the periphery of the substantially linear element of said plurality with the aid of a resin;
- the substantially linear elements of said plurality comprise portions in relief such as serrations on their periphery;
- threads are attached to at least one portion of at least some of the substantially linear elements of said plurality so as to reinforce still further corresponding portions of the metal tubular structure;
- the metal tubular structure comprises hollow metal tubular sections assembled together;
- the metal tubular structure is arranged to form a mast supporting radio transmission aerials;
- the metal tubular structure is arranged to form an offshore structure.

BRIEF DESCRIPTION OF THE DRAWINGS

Other features and advantages of the present invention will become apparent in the following description of nonlimiting examples of embodiments with reference to the appended drawings, in which.

MORE DETAILED DESCRIPTION

Figure 1:
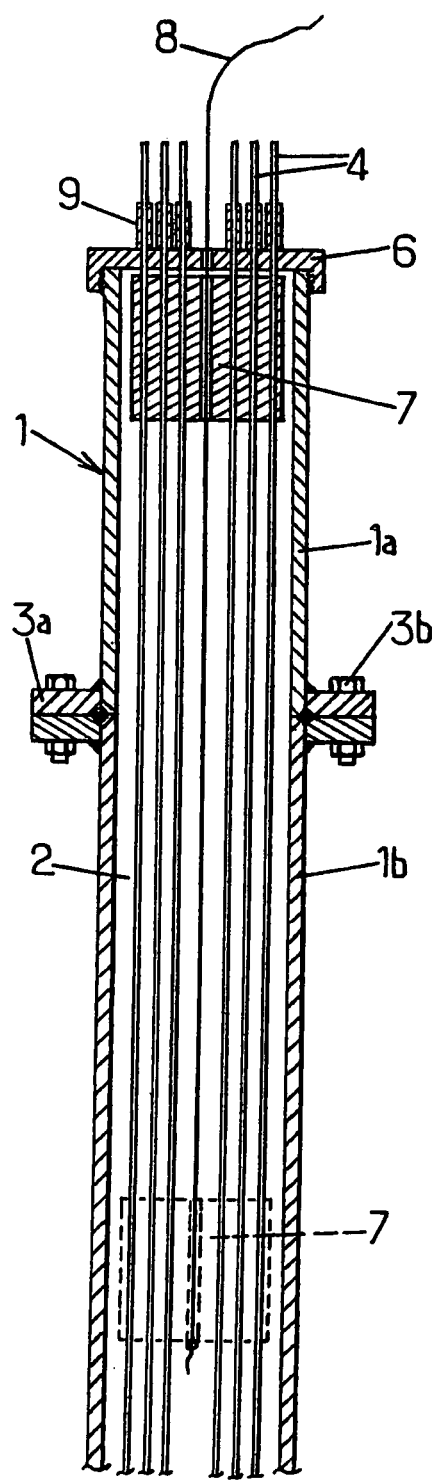
FIG. 1 is a diagram showing a metal tubular structure reinforced according to the invention.

FIG. 1 shows a metal tubular structure 1 reinforced according to the invention. This structure 1 is for example used to form a mast supporting, at its upper end, radio transmission aerials, for example for radio broadcasting, with the aim of transmitting or relaying electromagnetic wave transmissions.

As an alternative, the structure 1 of FIG. 1 can form part of an offshore structure, that is to say one used in the sea. Such a structure can be anchored at its lower end (not shown) for example in the ground, while its upper end, that can be seen in FIG. 1, is free.

The structure 1 of FIG. 1 comprises several tubular sections, of which two (1a, 1b) can be seen in the figure. These sections form welded hollow lengths. Each length can have for example a height rising to approximately ten meters. The sections are assembled together on site by fastening with assembling flanges 3a with the aid of fastening bolts 3b. These flanges constitute weak points in the structure 1 that the invention aims particularly to reinforce. As a variant, the metal tubular structure could be made in one piece, in particular if its height is low.

The reinforcement of the tubular structure 1 according to the invention comprises the introduction, inside the structure 1, of a plurality of substantially linear elements having a tensile strength greater than a predetermined value. This value can be chosen according to the stresses that are likely to be exerted on the structure. It is possible for example to use composite rods made of small-diameter carbon fibers 4 for example around 6 mm. These carbon rods are preferably introduced so as to extend along the length of the tubular structure, as illustrated in FIG. 1. They are advantageously positioned in a bundle of which the strength and tensile modulus are approximately 2400 MPa and 160 GPa.

The carbon rods 4 have the advantage of being flexible and light. They can moreover be rolled over a large length and can therefore be easily transported. They avoid the need of having to produce butt joins by sleeving. Moreover, the carbon rods permit easy manual application under difficult working conditions at a height. This application is in particular facilitated by stiffness and the absence of residual deformation after the carbon rods have been rolled up and unrolled.

As a variant, other linear elements can be used in place of carbon rods, such as threads, for example carbon threads in the form of fibers or strands.

In the example illustrated in FIG. 1, the carbon rods 4 are for example introduced inside the tubular structure 1 from its free upper end. This introduction is advantageously carried out so that the rods, after they are introduced, form a bundle of which the geometrical distribution is predetermined.

This is for example carried out with the aid of a mesh 6 connected to the free upper end of the tubular structure 1. This mesh 6 is provided with holes through which the carbon rods 4 are respectively introduced inside the tubular structure 1. In this way, carbon rods are sorted, which maintain a certain separation between each other. Once the carbon rods are introduced inside the tubular structure 1, the carbon rods are advantageously attached to the mesh 4 with the aid of anchorages 9.

In order to preserve the geometrical distribution of the bundle of rods 4 at a distance from the free upper end of the tubular structure 1, a perforated ballast weight 7 is advantageously positioned under the mesh 6. The ballast weight 7 possesses the same arrangement of holes as the mesh 6. The carbon rods are thus introduced inside the tubular structure 1 through the respective holes of the mesh 6 and the corresponding respective holes of the perforated ballast weight 7. Once the rods have been introduced and, as the case may be, anchored on the mesh 6, the perforated ballast weight 7 is lowered inside the tubular structure 1 with the aid of a cable 8 to the position represented by the broken line in FIG. 1. The desired separation between the carbon rods 4 is therefore maintained between the free upper end of the tubular structure 1 and the final position of the perforated ballast weight 7.

It will be noted that the carbon rods 4 can be introduced inside the tubular structure 1 one after the other or simultaneously in a bundle.

It will also be noted that the carbon rods 4, or any other substantially linear elements used in the reinforcement of the tubular structure, could also be introduced inside this structure from its lower end. To this end, a small-diameter orifice can be made in the bottom members of the structure in order to enable the rods to be introduced.

Once the carbon rods 4 have been introduced inside the tubular structure 1, a curable filling product is injected inside the structure, so that this product comes into contact with an internal surface of the tubular structure 1 and coats the carbon rods 4. In the embodiment where separation must be maintained between the carbon rods, this separation will preferably be chosen so that it enables the filling product to penetrate between the rods and in this way completely coat each of them.

The filling product injected inside the tubular structure 1 is for example a cement grout. Such a grout can be injected in a sufficiently fluid state to fill the internal space 2 of the tubular structure 1, ensuring an adherent contact with the internal surface of the tubular structure 1 and so as to coat the carbon rods 4. After curing, the cement grout obtains a 28-day compressive strength of around 65 MPa.

Such a monolithic composite, incorporating rods, increases the load-resisting section of the tubular structure 1 and in this way considerably improves its capacities of tensile and compressive strengths. The strength is even increased at the weak points, in particular in the region of the assembling flanges 3a, since the reinforcement comprising the carbon rods incorporated in the cement grout is distributed over all the length of the tubular structure 1 and in particular crosses these weak points.

As a variant, the curable filling product injected inside the tubular structure 1 can be a liquid concrete with a mineral binder, for example with an ultrahigh fiber-reinforced performance or a grout or a concrete with a synthetic binder. It can also consist of a filling resin.

Adhesion of the filling product to the internal surface of the tubular structure 1 can be improved for example by a tying effect or by the presence of welding beads and internal stiffeners in the structure.

Figure 2:
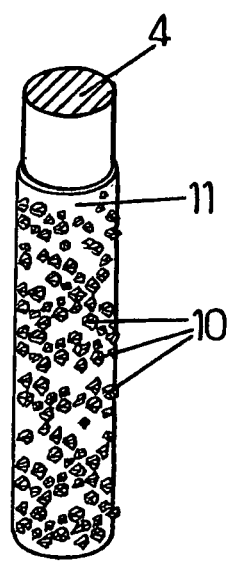
FIG. 2 is a diagram showing part of a carbon rod used to reinforce a metal tubular structure according to one embodiment of the invention.

FIG. 2 shows a carbon rod 4 of which a portion has been coated with a resin 11. This resin is preferably synthetic. It can for example consist of an epoxy resin. An aggregate deposit 10 has additionally been placed on the epoxy resin so as to be adhered to the rod 4. This aggregate can for example comprise dry sand 0.8 mm in size. Adhesion of the sand 10 to the carbon rod 4 is obtained advantageously in this way with the aid of a resin of the same nature as the matrix of the composite filling the interior of the tubular structure 1. Adhesion of the rod 4 to the cement grout is increased by the mineral interface of the sand and the roughness that it produces on the periphery of the rod.

Advantageously, the carbon rods 4 can also have portions in relief such as serrations on their periphery, so as to increase still further form-related adhesion to the cement grout. In the case where strands are introduced into the tubular structure rather than carbon rods, their helical surface permits such form adhesion.

According to an advantageous embodiment of the invention, the threads are attached to portions of some carbon rods 4 corresponding to some parts of the tubular structure 1 that it is particularly desired to reinforce.

The invention claimed is:

1. A method for reinforcing a metal tubular structure in operation, the metal tubular structure being installed so as to have an anchored lower end and a free upper end, the method comprising:

introducing inside the metal tubular structure from said free upper end in operation, a plurality of substantially linear elements having a tensile strength greater than a predetermined value, the substantially linear elements of said plurality being introduced inside the metal tubular structure via respective holes of a mesh connected to the metal tubular structure and via respective holes of a movable member, the holes of the movable member being distributed in a manner substantially corresponding to the holes of the mesh;

anchoring the substantially linear elements on the mesh;

lowering the movable member by its own weight with the aid of a cable, from the mesh toward the lower end of the metal tubular structure so as to form a bundle of substantially linear elements having a predetermined geometrical distribution; and injecting a curable filling product inside the metal tubular structure in operation, so that the curable filling product comes into contact with an internal surface of the metal tubular structure in operation and coats the substantially linear elements of said plurality.

2. The method as claimed in claim 1, wherein the substantially linear elements of said plurality comprise carbon rods.

3. The method as claimed in claim 1, wherein the substantially linear elements of said plurality comprise threads and/or strands.

4. The method as claimed in claim 1, and wherein the substantially linear elements of said plurality are introduced from said free upper end of the metal tubular structure.

5. The method as claimed in claim 1, wherein the curable filling product comprises a cement grout.

6. The method as claimed in claim 1, wherein the curable filling product comprises a liquid concrete with a mineral or synthetic binder.

7. The method as claimed in claim 1, wherein the curable filling product comprises a resin.

8. The method as claimed in claim 1, wherein an aggregate is attached to the periphery of the substantially linear elements of said plurality with the aid of a resin before said substantially linear elements are introduced inside the metal tubular structure.

9. The method as claimed in claim 1 wherein the substantially linear elements of said plurality have portions in relief such as serrations on their periphery.

10. The method as claimed in claim 1, wherein threads are attached on at least one portion of at least some of the substantially linear elements of said plurality so as to reinforce still further the corresponding portions of the metal tubular structure.

* * * * *